(12) United States Patent
Rosholm et al.

(10) Patent No.: US 6,380,707 B1
(45) Date of Patent: Apr. 30, 2002

(54) METHOD AND DEVICE FOR CONTROLLING A BRUSHLESS ELECTRIC MOTOR

(75) Inventors: Jesper Riber Rosholm, Aabenraa; Jan Carøe Aarestrup, Bjerringbro, both of (DK)

(73) Assignee: Danfoss Compressors GmbH, Flensburg (DE)

( * ) Notice: Subject to any disclaimer, the term of this patent is extended or adjusted under 35 U.S.C. 154(b) by 0 days.

(21) Appl. No.: 09/807,587
(22) PCT Filed: Oct. 12, 1998
(86) PCT No.: PCT/DK98/00442
  § 371 Date: Aug. 24, 2001
  § 102(e) Date: Aug. 24, 2001
(87) PCT Pub. No.: WO00/22723
  PCT Pub. Date: Apr. 20, 2000

(51) Int. Cl.$^7$ ................................................ H02P 6/18
(52) U.S. Cl. ........................ 318/439; 318/254; 318/721
(58) Field of Search ................................. 318/138, 254, 318/439, 459, 500, 700, 720, 721, 722, 724; 388/928.1

(56) References Cited

U.S. PATENT DOCUMENTS

| | | | |
|---|---|---|---|
| 5,144,209 A | * | 9/1992 | Ingji et al. .................. 318/254 |
| 5,382,889 A | * | 1/1995 | Peters et al. ................. 318/254 |
| 5,473,725 A | * | 12/1995 | Chen et al. .................. 318/254 |
| 5,506,487 A | * | 4/1996 | Young et al. ................ 318/811 |
| 5,640,073 A | * | 6/1997 | Ikeda et al. ................. 318/439 |
| 5,780,983 A | * | 7/1998 | Shinkawa et al. ........... 318/254 |
| 5,783,917 A | * | 7/1998 | Takekawa .................... 318/439 |
| 6,064,175 A | * | 5/2000 | Lee .............................. 318/809 |

* cited by examiner

Primary Examiner—Bentsu Ro
(74) Attorney, Agent, or Firm—Lee, Mann, Smith, McWilliams Sweeney & Ohlson

(57) ABSTRACT

The brushless electric motor (M) is provided with switching means ($Q_1$–$Q_6$) for selectively supplying current to the armature windings (U, V, W) of the motor (M) from a DC-power supply (1) The switching means ($Q_1$–$Q_6$) are controlled by measuring the back-electromotive forces developed in the windings (U, V, W) during operation and comparing these measurements with a high and low reference voltage, in such a way that each time a measured back-electromotive force with positive slope crosses the high reference voltage or a measured back-electromotive force with negative slope crosses the low reference voltage, a commutation signal is generated to commutate the switching means ($Q_1$–$Q_6$), this provides a highly simplified control of the switching means.

10 Claims, 4 Drawing Sheets

US 6,380,707 B1

METHOD AND DEVICE FOR CONTROLLING A BRUSHLESS ELECTRIC MOTOR

TECHNICAL FIELD

The present invention relates to a method and a device for controlling a brushless electric motor, preferably comprising a permanent magnet rotor and armature windings supplied with current from a DC-power supply via switching means controlled to selectively supply current to the armature windings.

BACKGROUND ART

In this field it is known to control the switching means using the zero crossing of the back electromotive forces developed during operation in the windings of the motor as a reference and delaying the commutation relative to the zero crossings in different ways.

From U.S. Pat No. 5,780,983 it is known to generate commutation signals for a brushless DC motor drive apparatus by comparing selected combinations of the terminal voltages of the armature windings. In order to adjust the timing of the commutation signals one combination of terminal voltages and an other combination of terminal voltages amplified with a certain gain factor are compared. This method requires a relatively complex set-up of amplifiers and comparators in order to generate the commutation signals.

From U.S. Pat. No. 5,640,073 it is known to use a delay of the back electromotive forces and to compare these delayed back electromotive forces with a saw-tooth wave reference voltage having a frequency proportional to the rotor speed and an amplitude whose center voltage is equal to the midpoint voltage. The amplitude of the saw-tooth wave is adjusted in accordance with the rotor speed or rotor current in order to adjust the resulting delay of the commutation signals. The object of the provision of the saw-tooth wave signal is to make it possible to use a delay angle for the back electromotive forces, which is less than 90°, in order to provide a quick response to sudden load variations. When the rotor speed is below a predetermined speed, it may be necessary to increase the time constant for the delay of the back electromotive forces.

From U.S. Pat. No. 5,506,487 a commutation method is known which does not use the detection of the zero-crossing. The three back electromotive forces are multiplexed onto one line and the polarity thereof is considered. A counter is counting up and down during periods with positive and negative multiplexed back-electromotive force respectively. The counter counts until a predetermined value is reached, whereafter commutation is performed. The predetermined value corresponds to the delay of the commutation after the zero-crossing of the back-electromotive force. This method is relatively complicated and requires calculating power.

The apparatus and method described in U.S. Pat. No. 5,327,053 relate to solving a different problem, namely the detection of rotor position prior to starting up the motor. The control of the motor after start up is based on a back-electromotive force zero-crossing commutation scheme which is not described in detail.

DISCLOSURE OF THE INVENTION

It is the object of the present invention to provide a method and a device of the kind mentioned above of a simple nature, with which it is possible to control the motor with a selfregulating commutation angle without delay filters or time measurements and without the use of the mid point voltage of the motor, and this object is achieved with a method of said kind which according to the present invention comprises the steps set forth in the characterizing clause of claim 1 and a device of said kind which according to the present invention comprises the features set forth in the characterizing clause of claim 6. With this arrangement, the generating of commutation signals is performed in a simple manner taking advantage of the trapezoidal curve form of the back-electromotive forces which are compared to a low and high reference voltage, whereby these reference voltages are adjusted to achieve the correct timing of the commutation signals. Furthermore, measurement of the zero-crossings of the back-electromotive forces is avoided which can be complicated due to electrical noise.

Preferred embodiments of the method and apparatus are revealed in the subordinate claims 2–5 and 7–10, primarily aiming at simplifying the generation of the reference voltages.

BRIEF DESCRIPTION OF THE DRAWING

In the following detailed part of the present description, the invention will be explained in more detail with reference to the exemplary embodiments of a device for controlling a brushless electric motor according to the invention shown in the drawings, in which.

DESCRIPTION OF THE OF THE PREFERRED EMBODIMENT

Figure 1:
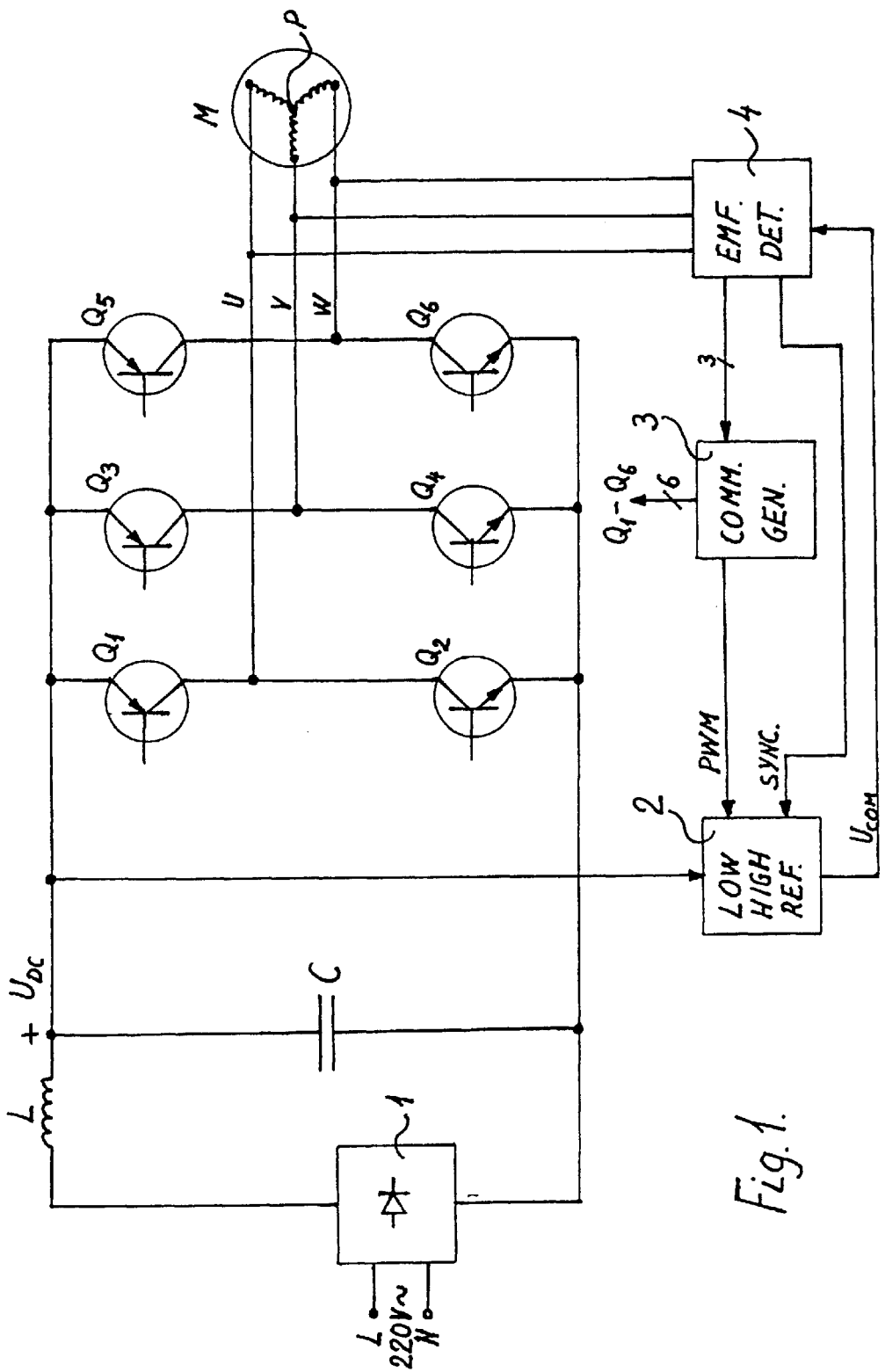
FIG. 1 diagrammatically shows a brushless motor provided with a control system in accordance with the invention.
Figure 2:
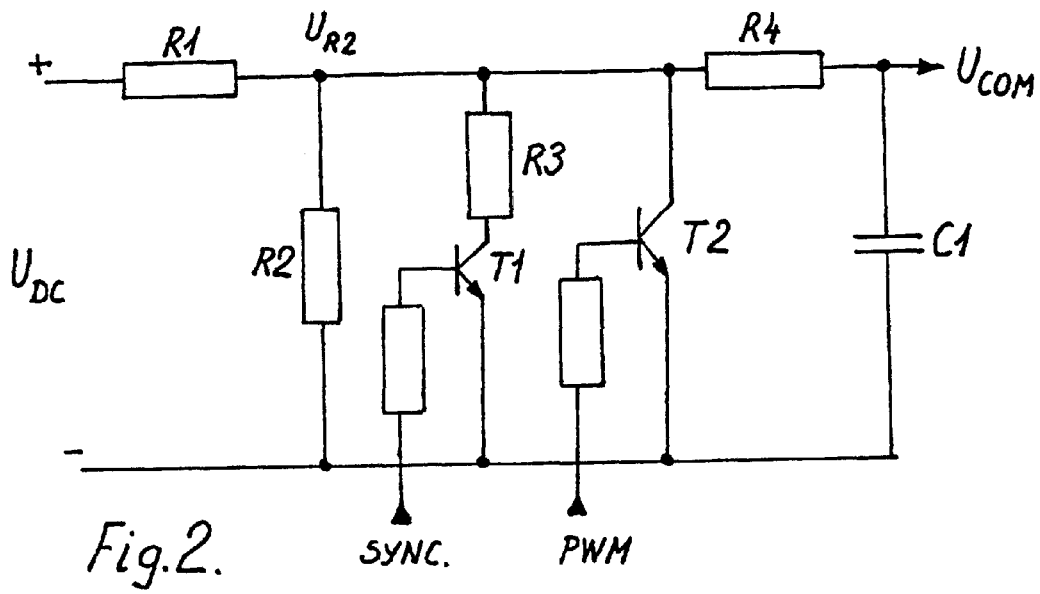
FIG. 2 shows a more detailed circuit diagram of a preferred circuitry for generating a common reference voltage.

The brushless motor shown in FIG. 1 comprises three armature windings U, V, W connected in a star configuration with a common midpoint P. Each winding U, V, W may be connected to the positive power supply or the negative power supply via transistors $Q_1$–$Q_6$ or corresponding switching elements. The power supply shown in FIG. 1 consists of a controlled rectifier with smoothing inductor L and capacitor C. Regulating of the intermediate voltage $U_{DC}$ is performed by means of the controlled rectifier. The switching elements $Q_1$–$Q_6$ are controlled by a commutation generator in accordance with signals received from an electromotive-force detector in such a way that a rotating magnetic field is generated by the windings U, V, W to rotate the rotor of the motor, which preferably is a permanent magnet rotor. Measurement of the back-electromotive force (back EMF) is performed by measuring the voltage on the idle, currentless phase winding. The back-electromotive force detector generates commutation signals for the commutation generator by comparing the back-electromotive forces developed during operation in the windings U, V, W with a low and high reference voltage received from a low and high reference voltage generator. The low and high reference voltages are preferably combined into a common reference signal $U_{COM}$ in order to simplify the circuitry in the back-electromotive force detector. Referring to FIG. 2, the low and high reference voltages are provided by simple resistive voltage dividers R1, R2, R3 using the intermediate voltage $U_{DC}$ and controlled by switching transistors T1, T2, which are controlled in accordance with a pulse width modulation signal and a synchronizing signal received from the commutation generator and the electromotive force detector, respectively. Before delivery to the electromotive force detector, the voltage $U_{R2}$ is smoothed by a resistance-capacitor network R4, C1 to define the common reference signal $U_{COM}$. More specifically the filter creates the mean value of the occasionally pulse width modulated voltage $U_{R2}$.

In the following, the function of the control circuit shown in FIGS. 1–3 will be explained with reference to FIG. 4 which shows different signal wave forms at various points of the circuit. A, B and C show the input signals to the comparators COMP 1–3 in FIG. 3. As shown in A, the back EMF in the winding U has a trapezoidal wave form and is compared with the common reference signal $U_{COM}$ for generating commutation signals for the commutation generator. The back EMF is superimposed on the midpoint voltage P. Starting from the left in A, the common reference signal $U_{COM}$ is equal to the high reference voltage and the back EMF in the winding U is rising until it reaches and passes the level corresponding to the high reference voltage at the time marked $t_1$, at which point the comparator COMP 1 changes its output from low to high, thereby signalling to the commutation generator that the switching element $Q_5$ has to be switched off and the switching element $Q_1$ has to be switched on. At the same time, the common reference signal $U_{COM}$ is changed to be equal to the low reference voltage. The next electromotive force crossing this low reference voltage is the back EMF from the winding W which crosses this low reference voltage at the time marked $t_2$. This crossing makes the output from the comparator COMP 3 change from positive to negative, thereby indicating to the commutation generator that the transistor $Q_4$ has to be switched off and the transistor $Q_6$ has to be switched on, and at the same time changing the common reference voltage to the high reference voltage level. Corresponding processes are performed at the times $t_3$, $t_4$, $t_5$, $t_6$ for one whole cycle for the system.

Figure 3:
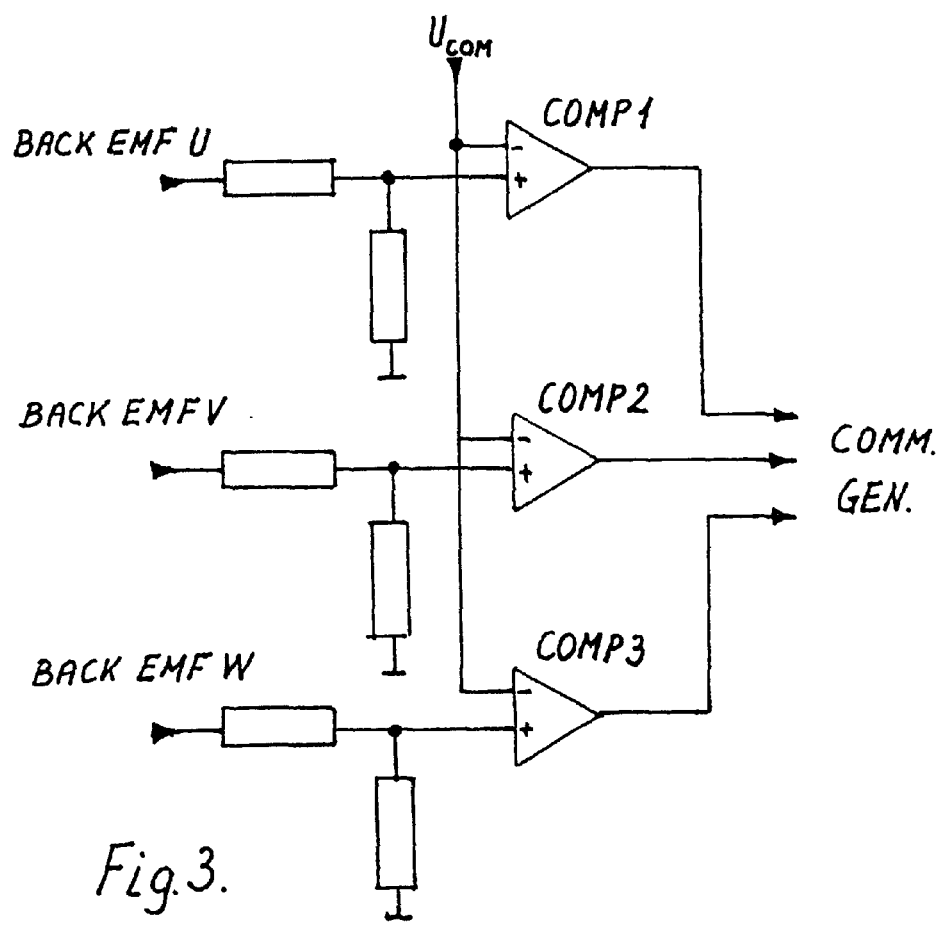
FIG. 3 shows a corresponding circuit diagram for detecting the electromotive forces in the windings.
Figure 4:
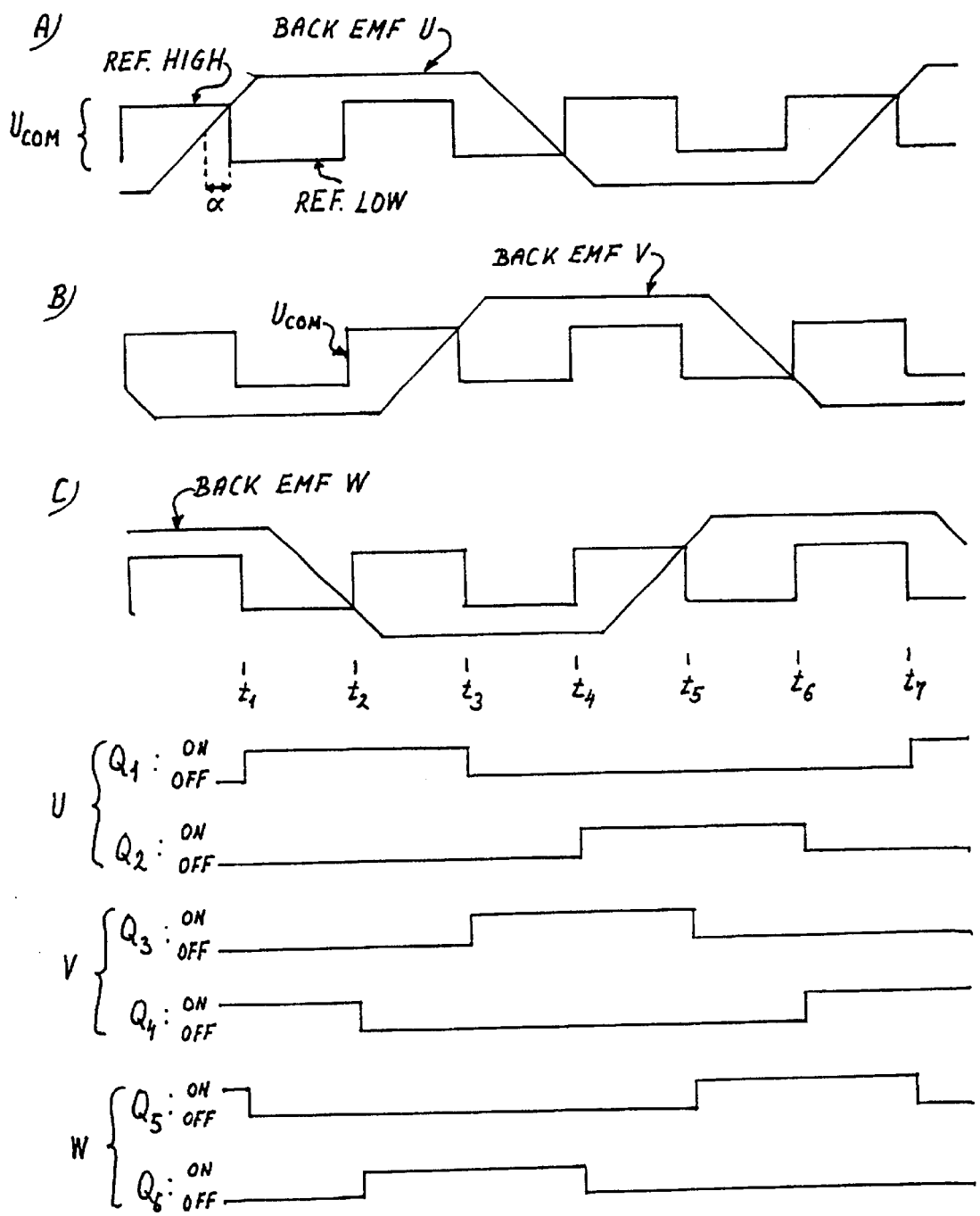
FIG. 4 shows different signal wave forms at various points of the circuits shown in FIGS. 1–3.

Following the explanation above, the comparators 1–3 in FIG. 3 thus generate a three-bit-information signal which is sent to the commutation generator. Just after time $t_1$ the information signal is 1-0-1 representing the signals from comparators COMP 1, 2 and 3 respectively. Inside the commutation generator, a look-up table contains stored commutation signals for the switches $Q_1$–$Q_6$. The information signal 1-0-1 from the comparators is used as a key to the look up table, and here the corresponding commutation signals stored are ($\overline{Q_5}$, $\overline{Q_3}$, $Q_1$; $\overline{Q_6}$, $\overline{Q}$hd 4, $\overline{Q_2}$). As can be seen from FIG. 4, commutation is activated each time a back EMF with positive slope crosses the high reference, and correspondingly each time a back EMF with negative slope crosses the low reference.

The synchronization signal for changing the common reference signal between the high reference voltage and the low reference voltage can be provided by a majority vote between the outputs from the comparators COMP 1–3. The synchronization signal is thus given each time one of the comparators changes state. As every state change is caused by a back EMF which is crossing either the high or low reference, the speed of the motor can be calculated from the number of state changes. As the synchronization signal is a speed dependent signal, the reference voltage $U_{COM}$ will also be speed dependent. Alternatively, $U_{COM}$ could be following the motor voltage on the phase U, V or W directly. Thus, the high and low reference automatically adapt to the motor speed enabling commutation also at a very low motor speed, where the amplitude of the generated back EMF is limited and detection of zero-crossings normally are problematic due to electrical noise.

An advantageous feature of the invention is the establishment of a selfregulating commutation angle. Normally, commutation is done about 15 degrees after the back EMF has made a zero crossing. Determining when the 15 degrees are reached can be solved in different ways, e.g. by using a counter counting up to a limit value from the time a zero crossing is detected, or alternatively integrating the back EMF from zero-crossing up to a limit value. These methods, however, places demands on the control circuitry as to calculative power and precision as to the commutation instants. Even slight deviations from the optimal commutation angle mean loss in motor efficiency. However, by synchronizing the reference levels with the motor speed, a selfregulating commutation angle α (shown in FIG. 4A) is achieved. During fixed speed operation, the value of the commutation angle α will be a fixed value; if on the other hand, the motor current increases, the motor voltage will also increase and the commutation angle α will become smaller. If the load decreases, the angle α will increase, hereby keeping the optimum commutation timing. The invention thus gives a selfregulating commutation angle α which is fixed related to the rotor speed and changes value, if changes in the load are occurring.

Figure 5:
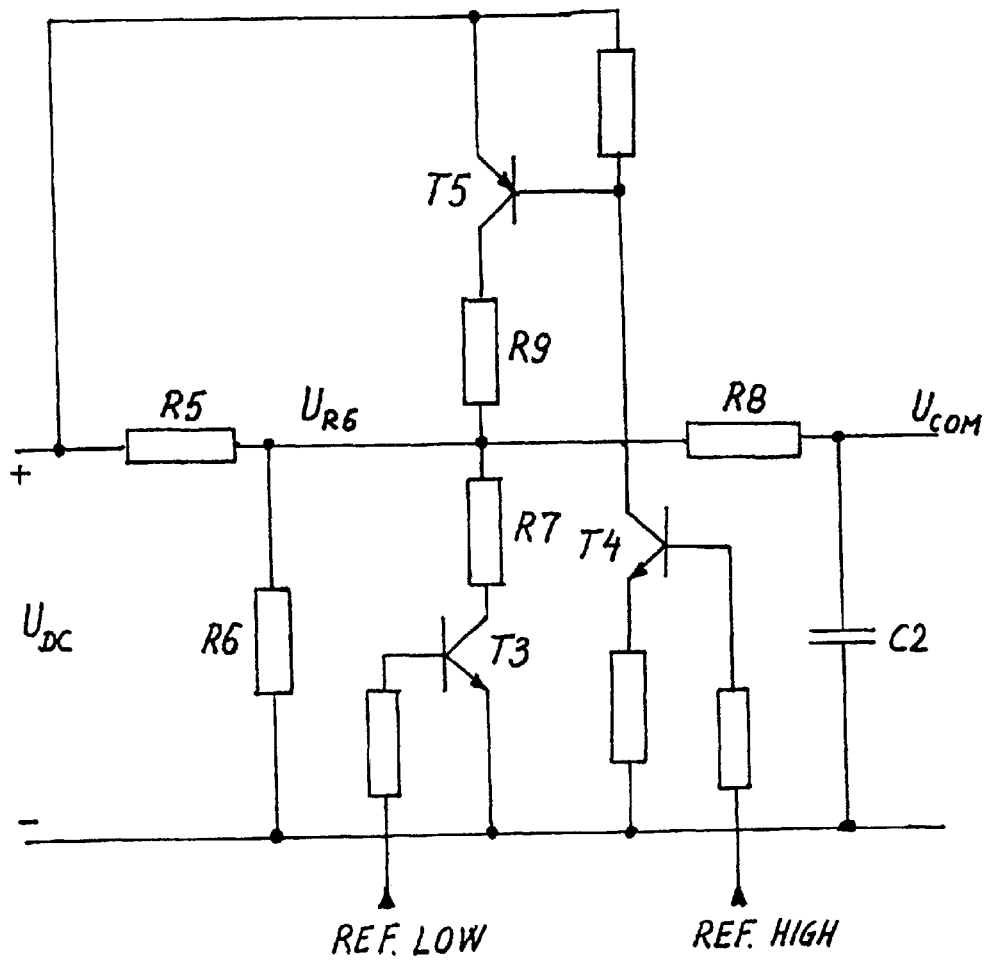
FIG. 5 shows a second embodiment of a diagram for generating a common reference voltage.

Control of the switches $Q_1$–$Q_6$ during normal operation can be done by means of PWM modulation. However, in this exemplary embodiment of the invention, the switches are block commutated, i.e. there is no change in the duration of the on-times. However, during start up of the motor it may be appropriate to control the switching transistors $Q_1$–$Q_6$ in accordance with a PWM scheme in order to limit the current in the windings of the motor. When using such a pulse-width-modulation scheme, the effective voltages supplied to the windings U, V, W are reduced and correspondingly, the back-electromotive forces from the windings are reduced. Accordingly, in this situation it is necessary to reduce the corresponding high reference voltage and low reference voltage correspondingly. This is provided by supplying sequentially the pulse-width-modulation signal used for pulse-width modulation of the switching transistors $Q_1$–$Q_6$, respectively, to the switching transistor T2 shown in FIG. 2. The circuit described is simple, but has the drawback that the PWM switch T2 only pulls the voltage $U_{R2}$ in one direction. This leads to minor inaccuracies in the timing of the commutations. It would be preferable to regulate the voltage $U_{COM}$ around a center voltage (corresponding to $U_{R2}$) which could be raised or lowered, giving more dynamic regulation possibilities. A circuit for generating the voltage $U_{COM}$ in said way is shown in FIG. 5. The low reference voltage is generated with a signal on transistor T3 while T4 is off. The high reference signal requires T3 to be off, whereas T4 is modulated with PWM. If T4 is switched on, the voltage on the basis of T5 decreases, and T5 starts conducting. The voltage $U_{R6}$ is now essentially determined by the resistors R9 and R6 (R5>>R9 and R6).

Although the invention has been described in connection with a preferred embodiment thereof, it will be understood that various changes may be performed without departing from the following claims, such variations comprising among other things using the high reference voltage and the low reference voltage without the change between the two levels and supplying those voltages to separate comparators, whereby the system shown in the drawings has to be changed in such a way that six comparators are used for comparing the back-electromotive forces with the two different reference voltage levels. Also, the invention could be used with a voltage stiff intermediate circuit as known in the art. This, however, would necessitate measurement of the phase voltages. Other modifications might involve using a motor with another number of windings than three, although this is preferred.

What is claimed is:

1. A method for controlling a brushless electric motor having switching means for selectively supplying current to armature windings of the motor from a DC-power supply, the method comprising the steps of measuring back-electromotive forces developed during operation in the windings of the motor, generating a low reference voltage and a high reference voltage, comparing said back-electromotive forces with said low and high reference voltages for generating commutation signals each time a measured back-electromotive force with positive slope crosses the high reference voltage, and/or a measured back-electromotive force with negative slope crosses the low reference voltage, and using said commutation signals to commutate the switching means.

2. Method in accordance with claim 1, comprising the further step of generating the low reference voltage and the high reference voltage as a common reference voltage signal constituted by a mainly square wave signal formed to correspond to the low reference voltage when comparing with a back-electromotive force with negative slope and to correspond to the high reference voltage when comparing with a back-electromotive force with positive slope.

3. Method in accordance with claim 2, comprising the further step of using pulse width modulation of the switching means during start up of the motor and generating the high and low reference voltages or the common reference voltage signal by pulse width modulation of voltages proportional to the DC-power supply voltage used by the switching means for supplying current to the windings of the motor.

4. Method in accordance with claim 2, comprising the steps of:

generating a control signal as a logic function of the result of the comparing of the electromotive forces and the reference voltage signal, and using said control signal to switch the common reference voltage signal between the low reference voltage and the high reference voltage.

5. Method in accordance with claim 1, comprising the further step of generating the high and low reference voltages proportional to the voltage applied to the windings or proportional to the speed of the motor.

6. Device for controlling a brushless electric motor provided with switching means for selectively supplying current to the armature windings of the motor from a DC-power supply, comprising means for measuring the back-electromotive forces developed during operation in the windings of the motor, means for generating a low and a high reference voltage, and means for comparing said back-electromotive forces with said low and high reference voltages and generating commutation signals each time a measured back-electromotive force with a negative gradient crosses the low reference voltage, or a measured back-electromotive force with a positive gradient crosses the high reference voltage, said commutation signal being supplied to a commutation generator controlling said switching means.

7. Device in accordance with claim 6, in which the means for generating the low and high reference voltages comprises means for generating a common reference voltage signal having a mainly square wave form, the common reference voltage signal being equal to the low reference voltage whenever comparing a back-electromotive force with a negative gradient and equal to the high reference voltage whenever comparing with a back-electromotive force with a positive gradient.

8. Device in accordance with claim 7, including means for synchronizing the common reference signal with the commutation signals, said means for synchronizing comprising logic circuits supplied with the commutation signals and supplying a switching signal to switch the common reference signal between the low and high reference voltages.

9. Device in accordance with claim 6, including means for generating the low and high reference voltages proportional to the voltage applied to the motor windings or proportional to the speed of the motor.

10. Device in accordance with claim 6, including means for driving the switching means in a pulse width modulation scheme during start up of the motor and the means for generating low and high reference voltages comprising means for pulse-width modulation of voltages proportional to the DC-power supply voltage supplied to the switching means, using the same pulse-width-modulation signals, and means for low pass filtering the resulting low and high reference voltages.

* * * * *